(12) United States Patent
Weatherall et al.

(10) Patent No.: US 10,146,788 B1
(45) Date of Patent: Dec. 4, 2018

(54) COMBINED MIRRORING AND CACHING NETWORK FILE SYSTEM

(71) Applicant: GOOGLE INC., Mountain View, CA (US)

(72) Inventors: James Neil Weatherall, Kirkland, WA (US); Alexey Pakhunov, Torrance, CA (US)

(73) Assignee: GOOGLE LLC, Mountain View, CA (US)

( * ) Notice: Subject to any disclaimer, the term of this patent is extended or adjusted under 35 U.S.C. 154(b) by 326 days.

(21) Appl. No.: 14/511,583

(22) Filed: Oct. 10, 2014

(51) Int. Cl.
*G06F 17/30* (2006.01)
*H04L 29/08* (2006.01)

(52) U.S. Cl.
CPC .... *G06F 17/30174* (2013.01); *H04L 67/2852* (2013.01); *G06F 17/30094* (2013.01); *G06F 17/30182* (2013.01); *G06F 17/30575* (2013.01)

(58) Field of Classification Search
CPC ............ G06F 11/2069; G06F 11/2071; G06F 11/1451; G06F 11/2058; G06F 17/30174; G06F 17/30575; G06F 17/30182; G06F 17/30094
USPC ........ 707/822, 825–827, 610–614, 617–618, 707/620
See application file for complete search history.

(56) References Cited

U.S. PATENT DOCUMENTS

| | | | | |
|---|---|---|---|---|
| 5,544,347 A * | 8/1996 | Yanai | .................... | G06F 3/0601 711/162 |
| 6,000,020 A * | 12/1999 | Chin | ................... | G06F 11/1456 370/401 |
| 6,052,797 A * | 4/2000 | Ofek | .................... | G06F 11/2064 709/219 |
| 6,266,785 B1 * | 7/2001 | McDowell | ............ | G06F 11/203 714/11 |
| 6,289,357 B1 * | 9/2001 | Parker | ................. | G06F 11/2082 707/610 |
| 6,360,330 B1 * | 3/2002 | Mutalik | .............. | G06F 11/1466 707/999.003 |
| 6,397,307 B2 * | 5/2002 | Ohran | ................. | G06F 11/1464 380/280 |
| 6,493,729 B2 * | 12/2002 | Gusler | ................ | G06F 11/2069 |
| 6,507,854 B1 * | 1/2003 | Dunsmoir | .......... | G06F 17/30902 707/999.202 |
| 6,538,669 B1 * | 3/2003 | Lagueux, Jr. | ......... | G06F 3/0481 711/170 |
| 6,587,935 B2 * | 7/2003 | Ofek | .................... | G06F 11/2069 711/162 |
| 6,654,912 B1 * | 11/2003 | Viswanathan | ...... | G06F 11/2064 707/999.202 |
| 7,039,778 B2 * | 5/2006 | Yamasaki | ........... | G06F 11/2071 707/999.202 |
| 7,073,090 B2 * | 7/2006 | Yanai | .................... | G06F 3/0601 714/6.31 |

(Continued)

*Primary Examiner* — Frantz Coby
(74) *Attorney, Agent, or Firm* — Brake Hughes Bellermann LLP

(57) ABSTRACT

An apparatus includes a memory including a mirrored file system associated with a file storage system, a filter module associated with the mirrored file system and configured to trigger a file operation based on an intercepted access to a file associated with the mirrored file system, and a synchronization manager configured to trigger a synchronization operation to a corresponding file on the file storage system based on the file operation triggered by the filter module.

18 Claims, 6 Drawing Sheets

(56) References Cited

U.S. PATENT DOCUMENTS

| | | | |
|---|---|---|---|
| 7,096,263 B2* | 8/2006 | Leighton | H04L 29/06 709/203 |
| 7,096,379 B2* | 8/2006 | Viswanathan | G06F 11/2064 707/999.202 |
| 7,139,851 B2* | 11/2006 | Fujibayashi | G06F 11/2058 707/999.2 |
| 7,266,653 B2* | 9/2007 | Tross | G06F 11/2076 711/161 |
| 7,418,439 B2* | 8/2008 | Wong | G06F 11/2069 |
| 7,437,601 B1* | 10/2008 | Manley | G06F 11/1451 711/162 |
| 7,673,098 B2* | 3/2010 | Howard | G06F 11/2071 711/100 |
| 7,797,670 B2* | 9/2010 | Bumgarner | G06F 9/5027 709/202 |
| 8,099,622 B2* | 1/2012 | Shitomi | G06F 11/2092 714/3 |
| 8,244,999 B1* | 8/2012 | Chatterjee | G06F 11/2064 707/655 |
| 8,266,107 B2* | 9/2012 | Fashchik | G06F 11/2071 707/656 |
| 8,286,127 B2* | 10/2012 | Bumgarner | G06F 9/5027 707/623 |
| 8,548,953 B2* | 10/2013 | Wong | G06F 17/30153 707/664 |
| 8,595,455 B2* | 11/2013 | Chatterjee | G06F 11/2064 707/655 |
| 8,799,413 B2* | 8/2014 | Taylor | G06F 17/30215 709/219 |
| 8,832,697 B2* | 9/2014 | Wong | G06F 9/5027 707/610 |
| 9,305,127 B2* | 4/2016 | Chen | G06F 17/5045 |
| 9,361,187 B2 | 6/2016 | Jarvis | |
| 2002/0144068 A1* | 10/2002 | Ohran | G06F 11/1464 711/161 |
| 2003/0028514 A1* | 2/2003 | Lord | G06F 11/2064 |
| 2007/0150665 A1* | 6/2007 | Arimilli | G06F 9/526 711/145 |
| 2009/0013014 A1* | 1/2009 | Kern | G06F 11/2058 |
| 2013/0185264 A1* | 7/2013 | Cohen | G06F 11/2069 707/656 |
| 2013/0232121 A1* | 9/2013 | Tucker | G06F 17/30283 707/655 |
| 2013/0238564 A1* | 9/2013 | Tucker | G06F 17/30174 707/656 |
| 2014/0129920 A1* | 5/2014 | Sheretov | G06F 17/30873 715/234 |
| 2015/0312337 A1* | 10/2015 | Keremane | H04L 67/1095 709/217 |

* cited by examiner

COMBINED MIRRORING AND CACHING NETWORK FILE SYSTEM

FIELD

Embodiments relate to accessing data stored on remote data server using a computing device or user device.

BACKGROUND

With the creation of the world-wide-web and high speed computer networks, the paradigm for personal computer usage has shifted. In the past, users would primarily use their personal computers to run programs, and store and manipulate data that was located on their local hard-drive. More recently, users have stored or manipulated data located on a networked drive, or run a program that was provided as a network service, and even then, the programs and data were usually restricted to a local area network. Today, more and more users are storing more and more data on remote data servers, and using local applications to manipulate and organize that data. For example, many users today store their personal email and contact information, and even pictures, videos, and music archives on remote servers, and access that data using applications that are locally executed.

SUMMARY

Accordingly, in the below description example embodiments disclose mechanisms for mirroring data stored at remote data servers on local computers or user devices.

In a general aspect, an apparatus includes a memory including a mirrored file system associated with a file storage system, a filter module associated with the mirrored file system and configured to trigger a file operation based on an intercepted access to a file associated with the mirrored file system, and a synchronization manager configured to trigger a synchronization operation to a corresponding file on the file storage system based on the file operation triggered by the filter module.

Implementations can include one or more of the following features. For example, the filter module can be further configured to intercept an access to the file associated with the mirrored file system, the access can be based on the file operation, pass the file operation to a utility configured to request services of a file system associated with the apparatus, and notify the synchronization manager if the access to the file changes data associated with the file. The synchronization manager can be further configured to receive a notification that the file associated with the mirrored file system has changed, determine the change associated with the file associated with the mirrored file system, and trigger the update of the corresponding file on the file storage system based on the determined change.

For example, data associated with the file can be absent from the memory, and the triggered synchronization operation can cause the data associated with the file to be downloaded to the memory, an application associated the access to the file to pause operation and/or a list of files stored in the memory to be updated to include the file. For example, the mirrored file system can be generated based on metadata associated with the file storage system. The filter module can be further configured to prevent the synchronization manager from downloading at least one file from the file storage system.

For example, the filter module can be further configured to prevent the synchronization manager from scanning the mirrored file system for changes to any of a plurality of files associated with the mirrored file system, the file operation can cause a change to data associated with one of the plurality of files associated with the mirrored file system, and the triggered synchronization operation to the corresponding file on the file storage system can cause changes to the corresponding file based on the change to the data associated with the one of the plurality of files. The apparatus can further include a pre-fetch module configured to indicate at least one file stored on the file storage system for download, and trigger an instruction causing the synchronization manager to download the at least one file to the memory.

In another general aspect, a method includes generating a mirrored file system in a local computing device based on a file system stored on a file storage system, preventing a downloading of data associated with a file of the mirrored file system from the file storage system, intercepting an access to the file, and triggering a download of data corresponding to the file from the file storage system.

Implementations can include one or more of the following features. For example, the method can further include intercepting a file operation to the file of the mirrored file system, passing the file operation to a utility configured to request services of a file system associated with the local computing device, and triggering a synchronization operation if the file operation changes data associated with the file. The method can further include receiving a notification that data associated with the file of the mirrored file system has changed, and triggering an update to data associated with a corresponding file on the file storage system based on the changed data. Generating of the mirrored file system can include generating the mirrored file system based on metadata associated with the file storage system.

For example, the method can further include preventing a scanning of the mirrored file system for changes to any of a plurality of files associated with the mirrored file system, intercepting a file operation that causes a change to data associated with one of the plurality of files associated with the mirrored file system, and triggering a synchronization operation to data corresponding to the one of the plurality of files on the file storage system based on the change to the data associated with the one of the plurality of files. The method can further include indicating at least one file stored on the file storage system for download, and triggering an instruction causing the at least one file to be downloaded to a memory of the local computing device.

In yet another general aspect, a non-transitory computer-readable storage medium having stored thereon computer executable program code which, when executed on a computer system, causes the computer system to perform steps. The steps include generating a mirrored file system in a local computing device based on a file system stored on a file storage system, preventing a downloading of data associated with a file of the mirrored file system from the file storage system, intercepting an access to the file, and triggering a download of data corresponding to the file from the file storage system.

Implementations can include one or more of the following features. For example, the steps can further include intercepting a file operation to the file of the mirrored file system, passing the file operation to a utility configured to request services of a file system associated with the local computing device, and triggering a synchronization operation if the file operation changes data associated with the file. The steps can further include receiving a notification that data associated with the file of the mirrored file system has changed, and triggering an update to data associated with a corresponding file on the file storage system based on the changed data. Generating of the mirrored file system can include generating the mirrored file system based on metadata associated with the file storage system.

For example, the steps can further include preventing a scanning of the mirrored file system for changes to any of a plurality of files associated with the mirrored file system, intercepting a file operation that causes a change to data associated with one of the plurality of files associated with the mirrored file system, and triggering a synchronization operation to data corresponding to the one of the plurality of files on the file storage system based on the change to the data associated with the one of the plurality of files. The steps can further include indicating at least one file stored on the file storage system for download, and triggering an instruction causing the at least one file to be downloaded to a memory of the local computing device.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
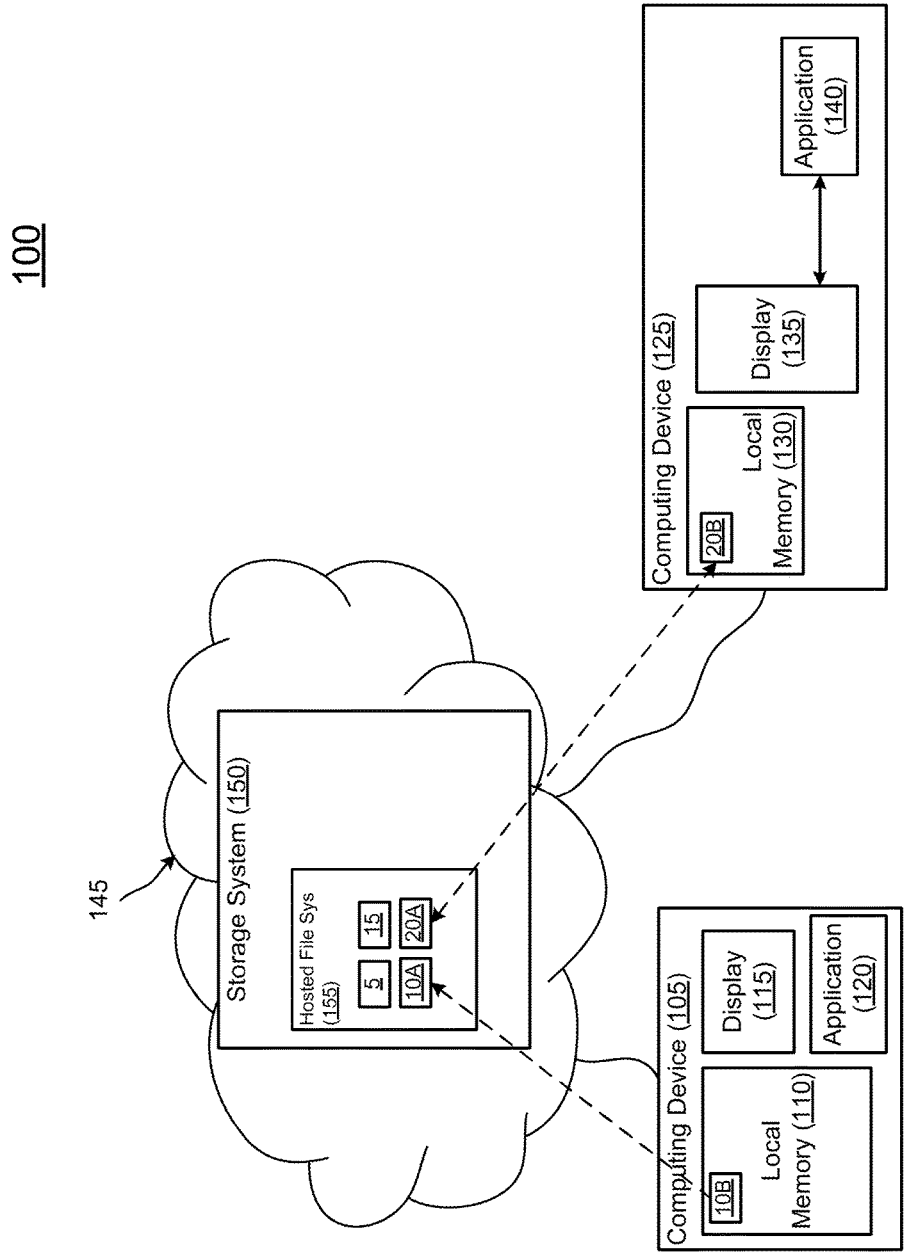
FIG. 1 is a block diagram that illustrates computing devices configured to access files from a cloud-based storage system operating within a cloud computing environment according to at least one example embodiment.

It should be noted that these Figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Example embodiments disclose mechanisms for mirroring data stored at remote data servers on local computers or user devices. In remote desktop applications, file systems, files and file data remain on remote data servers and data access by a local computer is through communications via a remote desktop client. By contrast, in mirrored file systems the local computer includes a mirror (or copy) of a file system of the remote data server including the data associated with the files. Further, the mirrored file system is continually scanned or monitored to detect changes to files and/or file data in order to synchronize the changes with the remote data server. In example embodiments, a mirrored file system includes metadata describing a file system, files and file data of the remote data server. However, the file data is not (or is prevented from being) downloaded onto the local computer. Further, in example embodiments, the mirrored file system is not continually scanned or monitored to detect changes to files and/or file data. Further details are described in detail below.

FIG. 1 is a block diagram that illustrates computing devices configured to access files from a cloud-based storage system operating within a cloud computing environment. As shown in FIG. 1, a cloud computing environment 100 includes computing devices 105, 125 and a cloud network system 145. The computing devices 105, 125 and the cloud network system 145 may be communicatively coupled using at least one internet (and/or, alternatively, intranet) communication standard.

As shown in FIG. 1, computing devices 105, 125 may be configured to access files from a storage system 150 operating within cloud network system 145. Because the storage system 150 is operating in the cloud computing environment 100 and the cloud network system 145, the storage system 150 can, in some implementations, be referred to as a cloud-based storage system, a file hosting service and/or a remote data storage resource. Also, the storage system 150 can be a remote (e.g., non-local) storage system that is remotely access by the computing devices 105, 125.

The computing devices 105, 125 can be any type of device configured to access elements of the cloud network system 145 (e.g., storage system 150) operating within the cloud computing environment 100. In some implementations, the computing devices 105, 125 can each be, for example, a wired device and/or a wireless device (e.g., Wi-Fi enabled device) and can be, for example, a computing entity (e.g., a personal computing device), a server device (e.g., a web server), a mobile phone, a touchscreen device, a personal digital assistant (PDA), a laptop, a television including, or associated with, at least one processor, a tablet device, e-reader, and/or so forth. The computing device(s) can be configured to operate based on at least one platform (e.g., at least one similar or different platform) that can include at least one type of hardware, software, firmware, operating systems, runtime libraries, and/or so forth.

In some implementations, the computing devices 105, 125 can have relatively few computing resources (e.g., processing resources, storage resources) compared with other systems within the cloud computing environment 100. Accordingly, the computing devices 105, 125 and cloud network system 145 can be collectively configured so that the computing devices 105, 125 can leverage the computing resources of the cloud network system 145. Specifically, the storage system 150 of the cloud network system 145 and the computing devices 105, 125 can be configured so that the storage system 150 operates as a primary storage system for the computing devices 105, 125. As shown in FIG. 1, the computing device 105 and the computing device 125, respectively, include a local memory 110 and a local memory 130. Even though the computing devices 105, 125 include local memories 110, 130, the local memories 110, 130 may be configured to operate as a cache of (e.g., a temporary cache, a temporary storage location to) the storage system 150. Accordingly, the local memories 110, 130 can function as a secondary storage to the primary storage of the storage system 150. In some embodiments, for example, a portion of a storage capacity of the storage system 150 allocated to (e.g., designated for use by) the computing device 105 can be more than 10 times greater (e.g., 100 times greater, 1000 times greater) than a storage capacity of the local memory 110 of the computing device 105.

Even though the local memories 110, 130 of the respective computing devices 105, 125 may function as a cache (or secondary storage) to the storage system 150, the files that are stored in at least one local memory 110, 130 and in the storage system 150 can be handled as a unitary or singular set of files. In other words, at least one local memory 110, 130, and the storage system 150 can function as a unitary storage system (e.g., a single virtual storage system, a single virtual hard drive). For example, files stored in at least one local memory 110, 130 and stored in the storage system 150 can be presented to a user (e.g., presented to a user via a user interface) accessing the files in such a way that the storage locations may not be readily distinguished as indicated by files 20A and 20B. Accordingly, whether a user accesses files via the computing device 105 or the computing device 125, a file listing associated with files (e.g., files 20A and 20B) stored in at least one local memory 110, 130, and the storage system 150 may be the same (or substantially the same).

As shown in FIG. 1, the storage system 150 is configured to store files 5, 10A, 15, 20A, organized in a hosted file system 155 (or directory), that can be designated into at least one category including hosted files, client files, remote source files (e.g., sourced at a device outside the cloud computing environment 100), and so forth. For example, a hosted file can be a file primarily stored (e.g., relatively permanently, not temporarily or only stored) on the hosted file system 155. For example, a client file can be a copy (or back-up) of a file primarily stored on a client device (e.g., computing device 125). In some example implementations the hosted file and the client file can be shared amongst a plurality of client devices. However, the client file can be "owned by" a client device and/or a user logged onto the client device on which (e.g., original) the client file is stored. Further, the hosted file can have an "owner" that accesses the hosted file via the hosted file system 155 using any client device.

In this implementation, most of the files 5, 10A, 15, 20A are labeled based on the category with which each of the files 5, 10A, 15, 20A is associated. Accordingly, the files 5, 10A, 15, 20A include at least one hosted file (e.g., files 5, 15, 20A) and a client file 10A. In some implementations, each of the files 5, 10A, 15, 20A can be any type of file such as, for example, a text-based file (e.g., a document file), a spreadsheet file, an image file (e.g., a joint photographic experts group (JPEG) file), a video file (e.g., a moving picture experts group (MPEG) file), a music file (e.g., an MPEG audio layer III (MP3) file), and so forth. Noting that example embodiments described in this disclosure are not limited to any specific type of file.

A hosted file (e.g., files 5, 15, 20A) can be a file created using any type of application that can create and/or store data. The application can be any type of application that can be, for example, hosted within the cloud computing environment 100 or executed on the computing device 105, 125. In some implementations, the application can be remotely controlled as it operates within the cloud computing environment 100 by at least one of computing device 105, 125.

The client file 10A can be a file that is stored in the storage system 150 as received from at least one of computing device 105, 125 (e.g., as a back-up of a file stored on one of computing device 105, 125). For example, the client file 10A can be a file that is stored in the storage system 150 and synchronized with a file stored on at least one of computing device 105, 125 (e.g., client file 10B). For example, the client file 10A can be a file produced using an application 120 operating at the computing device 105. The application 120 can be a local application installed at and operating at the computing device 105.

As shown in FIG. 1, at least a portion of the files 5, 10A, 15, 20A can be at least temporarily be stored (e.g., cached) in the local memory 130 of the computing device 125. Specifically, file 20B can be a portion (a significant portion or all) of file 20A which is stored in local memory 130 of the computing device 125. The file 20B can be a mirrored (sometimes called shadowed or synchronized) copy of any of the files stored in the storage system 150 (e.g., file 20A). For example, the file 20B can be a mirrored copy of the file 20A stored in the storage system 150. In some implementations, the file 20B can be a file that is stored (e.g., cached or stored temporarily) in the local memory 130 so that the file 20B can be readily accessed (e.g., manipulated) at computing device 125. Although not shown in FIG. 1, at least a portion of the files 5, 15, 20A can be at least temporarily stored in the local memory 110 of the computing device 105.

In some implementations, the computing devices 105, 125 can include (e.g., as a file manager application) or can execute (e.g., as web page) a user interface (not shown) through which a user of the computing devices 105, 125 can access the files 5, 10A, 15, 20A stored in the storage system 150 and/or at least one computing device 105, 125 (e.g., a file system user interface). In some implementations, the user interface can represent a listing of the files 5, 10A, 15, 20A (e.g., hierarchy, folder system, enumeration, record, inventory), metadata representing the listing of the files 5, 10A, 15, 20A, and/or other metadata about the files 5, 10A, 15, 20A (e.g., owner, creation date, filename, file availability/state). Accessing the files 5, 10A, 15, 20A (using the user interface) can include viewing, deleting, editing, downloading, uploading, and/or so forth.

For example, a hosted file (e.g., files 5, 15, 20A) can be produced and stored in the storage system 150 using an application in response to input from the computing device 125. The hosted file can later be viewed in a user interface provided at a display 115 of the computing device 125 through execution of the user device 125. Through operation of the user interface the hosted file can be selected and edited using the computing device 125 via an application (e.g., application 140).

The files 5, 10A, 15, 20A can be associated with a user account so that a listing of the files 5, 10A, 15, 20A provided within a user interface to the computing device 105 or the computing device 125 may be the same whether a user logs in to the computing device 105 or the computing device 125. In other words, the listing of the files 5, 10A, 15, 20A can be synchronized regardless of the computing device through which the listing of the files 5, 10A, 15, 20A is accessed. The listing of the files 5, 10A, 15, 20A provided within the user interface can be the same (e.g., synchronized, dynamically synchronized) even though a variety of categories of files can be included in the files 5, 10A, 15, 20A such as files categorized as a hosted file, a client file provided from a computing device, or a file associated with a remote source. The listing of the files 5, 10A, 15, 20A provided within the user interface can be the same even though the files 5, 10A, 15, 20A can be distributed between the storage system 150 and/or the computing devices 105, 125.

For example, in some implementations, a user can log in to the computing device 105 and can access and/or manipulate at least one file 5, 10A, 15, 20A. After the user logs out of the computing device 105, the user can later log in to the computing device 125 to access and manipulate at least one file 5, 10A, 15, 20A. When the user logs in to the computing device 125, the listing of the files 5, 10A, 15, 20A after the first login (using the computing device 205) can be presented to the user via the computing device 125. Accordingly, the listing of the files 5, 10A, 15, 20A can be seamlessly maintained (or synchronized) regardless of the computing device through which the user accesses files 5, 10A, 15, 20A. Thus, the storage system 150 and/or the hosted file system 155 can be configured to provide the same (or synchronized) listing of the files 5, 10A, 15, 20A whether the user logs into the computing device 105 and/or the computing device 125. In some implementations, even though the listing of the files 5, 10A, 15, 20A can be maintained between the computing devices 105, 125, in some implementations a state (e.g., whether or not data of the file has changed, a version) of at least one file 5, 10A, 15, 20A can change.

In some implementations, the file 20B can be a file that is downloaded to (e.g., fetched for) the computing device 125 for use at the computing device 125 by a user (if not already available in the local memory 130 of the computing device 125). In some implementations, a current version of a file (e.g., file 20B) may already be available in the local memory 130 of the computing device 125, and would not be downloaded from the storage system 150. In some implementations, before a file is downloaded from the storage system 150, the local memory 130 may be audited to determine whether or not the file is already cached in the local memory 130.

In some implementations, the file 20B can be downloaded into the local memory 130 on-demand by a user (e.g., in response to an instruction triggered by the user) of the computing device 125. In some implementations, the file 20B, is stored in the local memory 130 and can be available for offline access at the computing device 125. The computing device 125 may not have access to any network or a network where the storage system 150 can be accessed when offline. For example, a user of the computing device 125 can request access to the remote source file 20A stored in the storage system 150. In response to the request, a copy of the remote storage file 20A can be downloaded to the local memory 130 of the computing device 125 as file 20B. The file 20B can be used (e.g., edited, manipulated, access) by the user at the computing device 125. In some implementations, any changes to the file 20B can be mirrored in (e.g., synchronized within) the remote source file 20A stored in the storage system 150.

In some implementations, the file 20A can be fetched (e.g., pre-fetched) and downloaded to the computing device 125 as file 20B for use without being explicitly requested by a user of the computing device 125. In other words, at least one file can be automatically cached at the computing device 125 for use by a user. For example, when a user logs in to the computing device 125, the file 20A can be automatically downloaded to the local memory 130 of the computing device 125 and stored as file 20B. In some implementations, the file can be automatically downloaded based on at least one criteria. The criteria can be related to a prediction as to whether or not the file 20A may be accessed by the user of the computing device 125. In some implementations, the criteria can include a criteria related to recent accessing of the file 20A, relationship of the file to other recently accessed files 20A, file categories and/or file types typically accessed by the user, and/or so forth.

In some implementations, the file 20B can be removed from (e.g., deleted from, temporarily removed from, flushed from) the local memory 130 of the computing device 125. As an example, the file 20B can be removed from the local memory 130 of the computing device 125 based on at least one criteria including, for example, date-time stamp of the file 20B, size of the file 20B, and/or so forth. As another example, the file 20B can be removed from the local memory 130 of the computing device 125 in response to resources of the local memory 130 of the computing device 125 (or other components of the computing device 125) being re-allocated for other operations of the computing device 125. As yet another example, the file 20B can be removed from the local memory 130 of the computing device 125 in conjunction with other files that may be stored in the local memory 130.

In some implementations, the local memories 110, 130 can be any type of memory such as a random-access memory, a disk drive memory (e.g., a solid-state drive (SSD)), flash memory, and/or so forth. In some implementations, the local memories 110, 130 can be relatively long-term storage memory compared with other memory included in the computing devices 105, 125. In some implementations, the local memories 110, 130 can be the longest-term memory components included in the computing devices 105, 125. In some implementations, the local memories 110, 130 can be separate from cache memory associated with a processor and separate from RAM type memory. In some implementations, the local memories 110, 130 can be implemented as more than one memory component (e.g., more than one random-access memory (RAM) component or disk drive memory) associated with the components of the computing devices 105, 125.

The cloud computing environment 100 can include a variety of hardware and/or software components including servers (e.g., application servers), databases, and so forth. The components of the cloud computing environment 100 can be integrated into a computing infrastructure configured to share (e.g., dynamically allocate) resources and/or service a variety of endpoints including the computing devices 105, 125.

Figure 2:
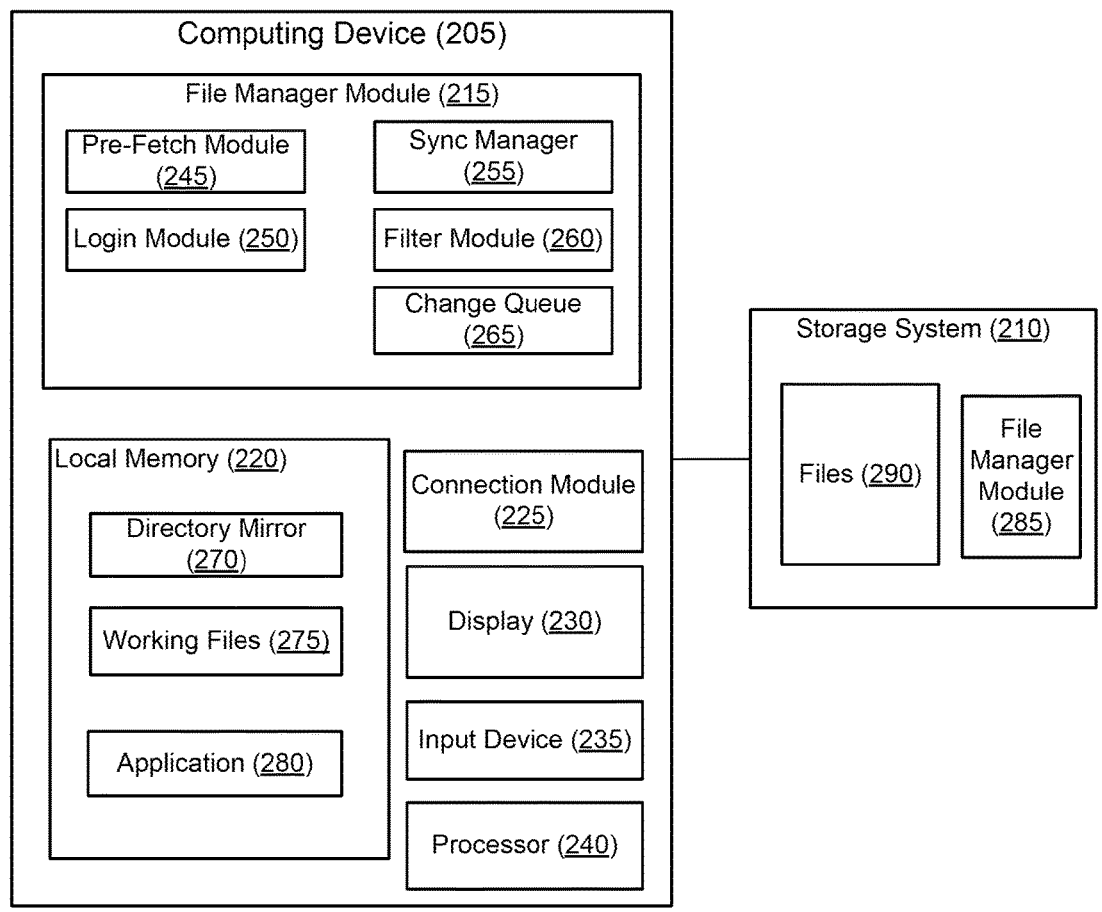
FIG. 2 is a block diagram of a system that illustrates a computing device and a storage system according to at least one example embodiment.

FIG. 2 is a block diagram of a system 200 that illustrates a computing device 205 and a storage system 210 according to at least one example embodiment. As shown in FIG. 2, the computing device 205 includes a file manager module 215, a local memory 220, a connection module 225, a display 230, an input device 235, and a processor 240. The file manager module 215 includes a pre-fetch module 245, a login module 250, a sync manager 255, a filter module 260, and a change queue 265. The local memory 220 includes a directory mirror 270, working files 275, and an application 280. The storage system 210 includes a file manager module 285 and files 290.

The computing device 205 may be configured to establish at least a portion of a communication link (e.g., a unidirectional communication link, a bidirectional communication link) with the storage system 210. Although not shown in FIG. 2, the computing device 205 and the storage system 210 can be configured to operate within a cloud computing environment(s).

The file manager module 215 can be configured to interact with (e.g., access, trigger operations of) the file manager module 285 of the storage system 210 (or the hosted file system 155). The file manager module 215 can, in some implementations, be an application configured to operate on the computing device 205. The processor 240 can be associated with any of the components of the computing device 205, and can be used for execution of any of the operations of the computing device 205. The file manager module 285 of the storage system 210 (or the hosted file system 155) may be configured to resolve file conflicts. File conflicts may result from two or more devices changing a same file. For example a user associated with computing device 205 may modify file 20A while a user using application 140 modifies file 20A (using file 20B). The file manager module 285 (or the hosted file system 155) may resolve conflicts (e.g., by storing the new files using different names) when the changed files are synchronized with file 20A.

The file manager module 215 includes a sync manager 255 that can be configured to determine a state (or a change of a state) of at least one file 290 associated with the storage system 210 as compared to a state of at least one working file 275 associated with the computing device 205. In some implementations, one or more of the states can be designated based on a category of the file. In some implementations, one or more of the states can designated based on whether a file has been recently (or is currently) cached or un-cached in the local memory 220 of the computing device 205. In some implementations, a state of the file can be designated by default (without an explicit instruction from a computing device). In some implementations, a state of the file can be designated based on metadata associated with the file. In other words, the state of a file can be based on any combination of a category designation, an instructions from a user, by default, how recently a file has been locally cached or whether the file is un-cached (not locally cached), whether or not a file has changed as compared to a corresponding storage system file, if a file is or has been synchronized with a corresponding storage system file, and/or so forth.

The file manager module 215 also includes a login module 250 configured to handle at least one user account associated with the files 290 (e.g., via a user interface of a client device). The file manager module 215 also includes a pre-fetch module 245 configured to automatically cache a file at the computing device 205. For example, when a user logs in to the computing device 205, a file (e.g., file 20A) can be automatically downloaded to the local memory 220 of the computing device 205 and stored (e.g., as file 20B). In some implementations, the file can be automatically downloaded based on at least one criteria. The criteria can be related to a prediction as to whether or not the file may be accessed by the user of the computing device 205. In some implementations, the criteria can include a criteria related to recent accessing of the file, a relationship of the file to other recently accessed files, file categories and/or file types typically accessed by the user, and/or so forth.

The file manager module 215 includes a filter module 260 that can be configured to inhibit the downloading of files during a mirroring process and to download a file in response to a request to use the file. The filter module 260 may be a file system filter driver. The filter module 260 may operationally hook system calls (e.g., associated with files stored on the storage system 210) and write the system calls to a file system (e.g., backed up by some local storage). For example, when the file manager module 215 (e.g., the sync manager 255) is mirroring (e.g., synchronizing) a file system, the filter module 260 may prevent or cause the file manager module 215 to not download the data representing the file.

In an example implementation, filter module 260 communicates a file transfer complete command to the sync manager 255. This has the effect of causing the file manager module 215 to indicate the data representing a file (or a plurality of files) has been downloaded when the data representing the file (or a plurality of files) has not been downloaded. The filter module 260 may communicate the file transfer complete command to the sync manager 255 after metadata representing the listing of the file and/or other metadata about the file (e.g., owner, creation date, filename, file availability/state) has been downloaded. Accordingly, a resultant mirrored file system includes a file directory (e.g., directory mirror 270) including the metadata associated with a file (or plurality of files) and does not include the data representing the file (or a plurality of files).

The filter module 260 can be configured to monitor attempts to use a file (e.g., file 20A) and request, fetch and/or cause the download of the file from the storage system 210 to the computing device 205. In other words, the filter module 260 can be configured to intercept file system operations associated with files stored on the storage system 210 (and locally mirrored). The filter module 260 may also be configured to trigger a download of a file (e.g., file 20A). For example, the filter module 260 may determine the file has been opened (e.g., selected to be opened by a user of application 280) that is not currently stored on the computing device 205. The filter module 260 may then cause the sync manager 255 to download the file to be opened (e.g., as file 20B). The filter module 260 may cause a delay in the application 280 as the application 280 attempts to read the file (e.g., because the application 280 has an indication that the file exists on the computing device 205 when the file does not exist on the computing device 205).

According to example embodiments, the filter module 260 may be configured to trigger a synchronization operation by the sync manager 255. In other words, when a change occurs to a file (e.g., 20B), the filter module 260 may signal the sync manager 255 to synchronize the changed file (e.g., send updates to the storage system 210). Accordingly, the sync manager 255 may not (or may not be configured to, or may be inhibited from) scan or not monitor the files (e.g., working files 275) for changes. In other words, by triggering a synchronization operation when a change occurs to a file (e.g., 20B), the filter module 260 removes the need for the sync manager 255 to continually scan the mirrored file system to monitor for file changes. Therefore, the sync manager 255 does not have to waste resources checking files that may not change or infrequently change.

In an example implementation, the filter module 260 may communicate a command to the sync manager 255. The command may indicate the file (e.g., file 20A) on the storage system 210 has changed. The indication that the file has changed may trigger the sync manager 255 to download the file and replace the file on the computing device 205 with the downloaded file (e.g., as file 20B). The filter module 260 may communicate the command to the sync manager 255 only if the file is currently stored on the computing device 205 and the file is not currently open in an application or being manipulated by an application executing on the computing device 205. In order to determine the file is currently stored on the computing device 205, the filter module 260 may maintain a list of files. The list of files may include a listing of files stored on the computing device 205 or a list of files that are not stored on the computing device 205. The filter module 260 may determine the file is currently stored on the computing device 205 based on the list (e.g., by performing a search of the list). In an example implementation, the list of files may be limited to those files currently in use, recently in use or pre-fetched (e.g., anticipated to be used) by an application associated with computing device 205 (e.g., application 280). In other words, files can be added or subtracted from the list of files based on some criteria. Data associated with added files (e.g., through a pre-fetch heuristic) may be downloaded to the computing device 205. Data associated with subtracted files may also be deleted from the computing device 205.

In an example implementation, the filter module 260 may be configured to pass through (or forward) typical file operations (e.g., create, read, write, update, delete, and/or the like) to a utility or user program configured to request service(s) of a file system. For example, the filter module 260 may be configured to pass through to an operating system, a file system (e.g. FAT, NTFS, HFS, UFS, and/or the like), a file system driver and/or a file system Application Programming Interface (API) associated with the computing device typical file operations (e.g., create, read, write, update, delete, and/or the like).

The file manager module 215 includes a change queue 265 configured to store changes (or indications of changes or pointers to changes) to a file stored in (or associated with) the working files 275 (e.g., files downloaded from files 290). In one example implementation, the sync manager 255 can store changes to files in the change queue 265. Then, based on some configuration, the sync manager 255 can send the changes to the storage system to be synchronized (e.g., update the corresponding file associated with files 290). The configuration can be based on a time period (e.g., synchronize every 30 seconds), a trigger (e.g., closing the application 280 or shutting down the computing device 205), a number of changes of files in the queue (e.g., 80% full), an amount of activity over a communication channel (e.g., synchronize changes during a period of inactivity), and/or the like. In some example implementations, when the computing device 205 is actively connected to the storage system 210 (e.g., when the computing device 205 is not operating offline), the sync manager 255 may synchronize (e.g., send the changes) upon receiving an indication of a change and does not queue the change.

The local memory 220 includes a directory mirror 270 that can be configured to mirror a directory (e.g., file structure) associated with the files 290 of the storage system 210. The directory mirror 270 may be based on metadata (described above) received from the storage system 210 that describes a file structure and includes information associated with each file in files 290. The directory mirror 270 (and metadata) may be limited to the files or data for an authorized user and/or user of the application 280 based on an authorization performed by the login module 250.

The local memory 220 includes a working files 275 that can be configured to store or cache files that are in use, have been used and/or may be used (e.g., pre-fetched) by the application 280. The computing device 205 includes a connection module 225 configured to establish at least a portion of a communication link between the computing device 205 and the storage system 210. In some implementations, the communication link between the computing device 205 and the storage system 210 can be a wireless connection, a wired connection, a peer-to-peer connection, a network connection, a secure connection, an encrypted connection, and/or so forth.

The computing device 205 includes an input device 235 that can be configured to trigger at least one operation of the computing device 205. In some implementations, the input device 235 can be, or can include, for example, a mouse device, a keyboard device, a touchpad device, a microphone, and/or so forth. The computing device 205 includes a display 230 that can be any type display such as, for example, a light emitting diode (LED) display, an electrostatic touch device, a resistive touchscreen device, a surface acoustic wave (SAW) device, a capacitive touchscreen device, a pressure sensitive device, a surface capacitive device, a projected capacitive touch (PCT) device, and/or so forth. If the display 230 is a touch sensitive device, the display 230 can function as an input device. For example, the display 230 can be configured to display a virtual keyboard (e.g., emulate a keyboard) that can be used by a user as an input device.

The components (e.g., modules, processors) of the computing device 205 and/or the storage system 210 can be configured to operate based on at least one platform (e.g., at least one similar or different platform) that can include at least one type of hardware, software, firmware, operating systems, runtime libraries, and/or so forth. In some implementations, the components of the storage system 210 can be configured to operate within a cluster of devices (e.g., a server farm). In such an implementation, the functionality and processing of the components of the storage system 210 can be distributed to several devices of the cluster of devices.

The components of the computing device 205 and/or the components of the storage system 210 can be, or can include, any type of hardware and/or software configured to process attributes. In some implementations, at least one portion of the components shown in the components of the computing device 205 and/or the components of the storage system 210 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, at least one portion of the components of the computing device 205 and/or the components of the storage system 210 can be, or can include, a software module configured for execution by at least one processor (not shown). In some implementations, the functionality of the components can be included in different modules and/or different components than those shown in FIG. 2.

In some implementations, at least one component of the computing device 205 and/or the components of the storage system 210 can be, or can include, processors configured to process instructions stored in a memory (in conjunction with or in addition to those shown). For example, the file manager module 215 (and/or a portion thereof) can be, or can include, a combination of a processor and a memory configured to execute instructions related to a process to implement at least one function.

In some implementations, the storage system 210 can be a remote database, a local database, a distributed database, a relational database, a hierarchical database, and/or so forth. In some implementations, the storage system 210 can be, or can include, a memory shared by multiple devices such as computing device 205. In some implementations, the storage system 210 can be associated with a server device (not shown) within a network and configured to serve the components of the computing device 205.

Although not shown, in some implementations, the components of the storage system 210 can be configured to operate within, for example, a data center (e.g., a cloud computing environment), a computer system, at least one server/host device, and/or so forth. In some implementations, the components of storage system 210 can be configured to operate within a network. Thus, the components of the storage system 210 can be configured to function within various types of network environments that can include at least one device and/or at least one server device. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include at least one segment and/or can have a portion based on various protocols such as Internet Protocol (IP) and/or a proprietary protocol. The network can include at least a portion of the Internet.

FIGS. 3, 4, 5 and 6 are flowcharts of methods according to example embodiments. The steps described with regard to FIGS. 3, 4, 5 and 6 may be performed due to the execution of software code stored in a memory associated with an apparatus (e.g., as shown in FIG. 2) and executed by at least one processor associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 3, 4, 5 and 6.

Figure 3:
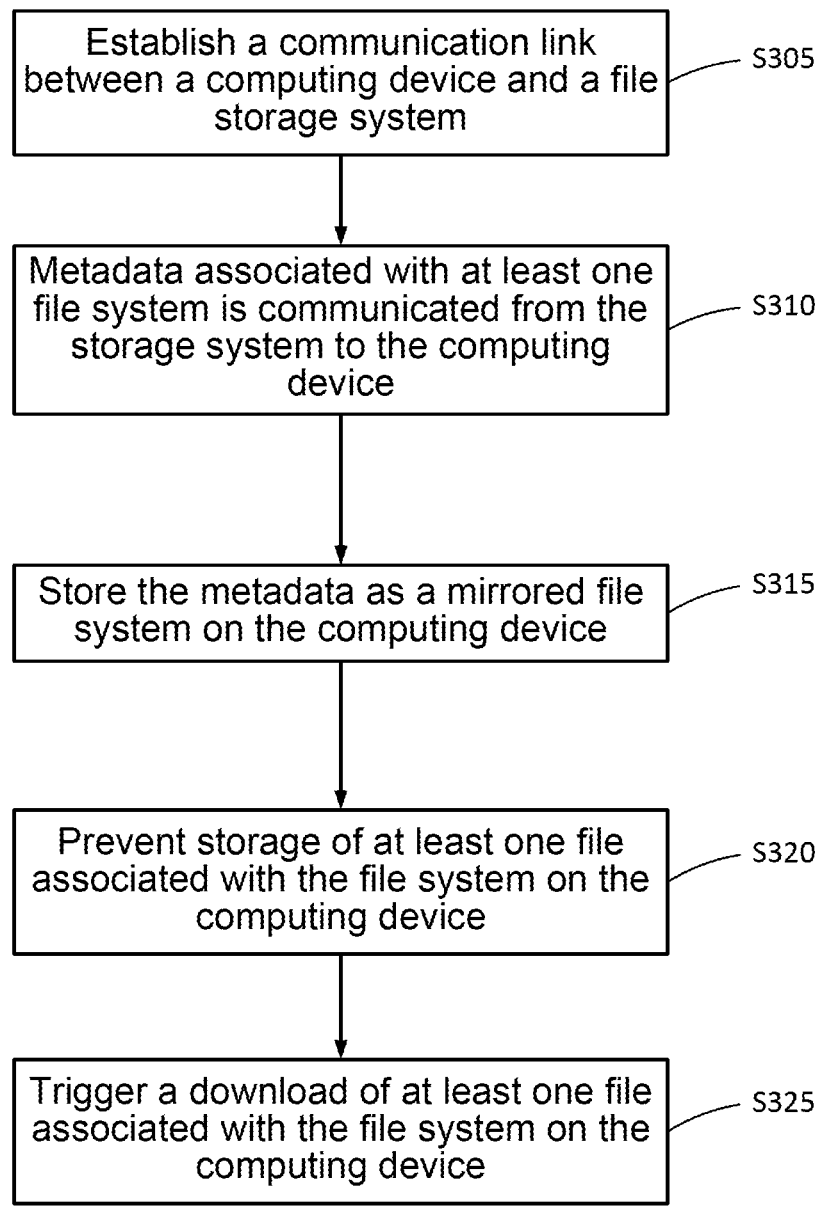
FIGS. 3, 4, 5 and 6 are flowcharts of methods according to example embodiments.

FIG. 3 illustrates a flow diagram of an example process for mirroring a file system on a computing device, in accordance with an example implementation. As shown in FIG. 3, in step S305 a communication link between a computing device and a file storage system is established. For example, the communication link between the computing device (e.g., computing device 105, 125, 205) and the storage system (e.g., storage system 150, 210) can be a wireless connection, a wired connection, a peer-to-peer connection, a network connection, a secure connection, an encrypted connection, and/or so forth. For example, the connection module 225 may establish the communication link between the computing device 205 and the storage system 210.

In step S310 metadata associated with at least one file system is communicated from the storage system to the computing device. The file system may be a file system on the storage system for which a user of the computing device has access to or authority to use. The file system may include a file structure (e.g., folder/sub-folder associations) and files (e.g., data files). The metadata may describe or include information about the file structure and the files. For example, metadata associated with hosted file system 155 and files 5, 10A, 15, 20A may be communicated to computing device 105, 125, 205.

In step S315 the metadata is stored as a mirrored file system on the computing device. The metadata may be stored in a local memory associated with the computing device. For example, local memory 220 includes a directory mirror 270 (e.g., a portion of memory 220). The metadata may be stored in (or as) the directory mirror 270.

In step S320 storage of at least one file associated with the file system is prevented from being stored on the computing device. For example, the filter module 260 may communicate a message to the sync manager 255 that causes the sync manager 255 to not download the at least one file. The message may indicate that the at least one file has already been downloaded.

In step S325 a download is triggered to download at least one file associated with the file system on the computing device. For example, the filter module 260 may monitor file open requests, receive a pre-fetch request or receive some other indication that a file should be stored locally. If the file request is for a file not stored on the computing device, the filter module 260 may trigger the sync manager 255 to download the requested file. The sync manager 255 may cause the download based on other requests as well. For example, the pre-fetch module 245 may communicate a request for a file to the sync manager 255.

Figure 4:
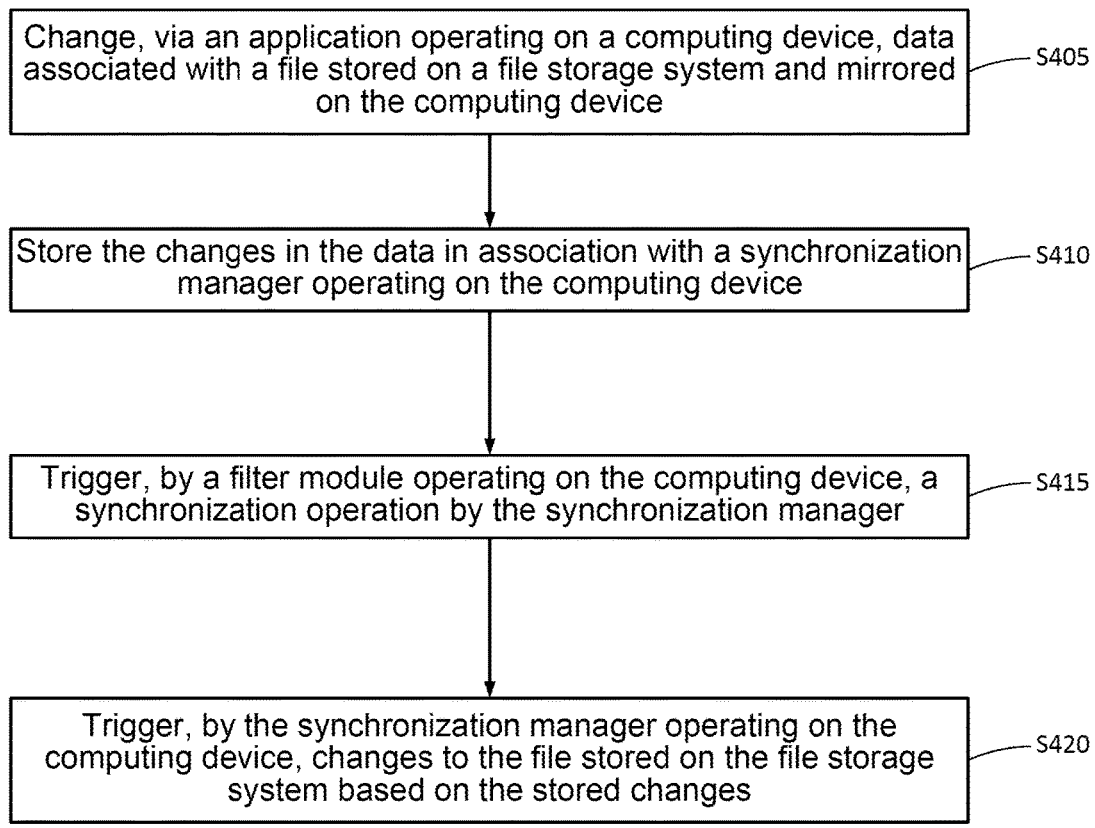

FIG. 4 illustrates a flow diagram of an example process for synchronizing a file, in accordance with an example implementation. As shown in FIG. 4, in step S405 an application operating on a computing device changes data associated with a file stored on a file storage system and mirrored on the computing device. For example, application 140 may change data (e.g., edit a photo or document) associated with file 20B which corresponds to file 20A stored on storage system 150.

In step S410 the changes in the data are stored in association with a synchronization manager operating on the computing device. For example, the changes may be stored in change queue 265. Alternatively, and/or in addition to, changes are reflected in the data and the synchronization manager 255 is configured to compare, for example, versions of the data to determine the changes. In this case the changes may or may not be stored in change queue 265. In this case, step S410 may be performed after step S315. For example, in one implementation the synchronization manager 255 may be configured to store changes (e.g., in change queue 265) until a threshold number of stored changes exist. For example, in one implementation the synchronization manager 255 may be configured to continuously synchronize with files stored on the storage system 210.

In step S415 a filter module operating on the computing device triggers a synchronization operation by the synchronization manager. For example, filter module 260 may be configured to aide (or help) in the operation of changing the data. In one implementation, the filter module 260 may be configured to pass through (or forward) typical file operations (e.g., create, read, write, update, delete, and/or the like) to a utility or user program configured to request service(s) of a file system. For example, the filter module 260 may be configured to pass through to an operating system, a file system (e.g. FAT, NTFS, HFS, UFS, and/or the like), a file system driver and/or a file system Application Programming Interface (API) associated with the computing device typical file operations (e.g., create, read, write, update, delete, and/or the like). Accordingly, upon receiving changes to the data the filter module 260 may pass the changes, as an update of the data, to the operating system and/or a file system. Simultaneously, or substantially simultaneously, or upon receiving an indication or notification that the operating system and/or a file system has completed the changes, the filter module 260 may communicate an indication or notification of the change to the synchronization manager 255. The indication or notification may include a name of the file, an ID of the file, a pointer to the file, and/or the like. Upon receiving the indication or notification, the synchronization manager may trigger a synchronization of the changed file. For example, the filter module 260 may send a synchronization command or function to the synchronization manager 255, the synchronization command including a file ID as a variable parameter. Because the filter module 260 triggers the synchronization, the synchronization manager 255 does not need to monitor, scan and/or the like the file system of the computing device for changes to files in order to determine what files may need to be synchronized.

In step S420 the synchronization manager operating on the computing device triggers changes to the file stored on the file storage system based on the stored changes. For example, upon receiving the indication or notification, the synchronization manager 255 may send the changes to the file manager module 285 or the hosted file system 155. The file manager module 285 or the hosted file system 155 may update a corresponding file with the changes. For example, the file manager module 285 or the hosted file system 155 may update file 20A with changes made to file 20B on the computing device 125.

Figure 5:
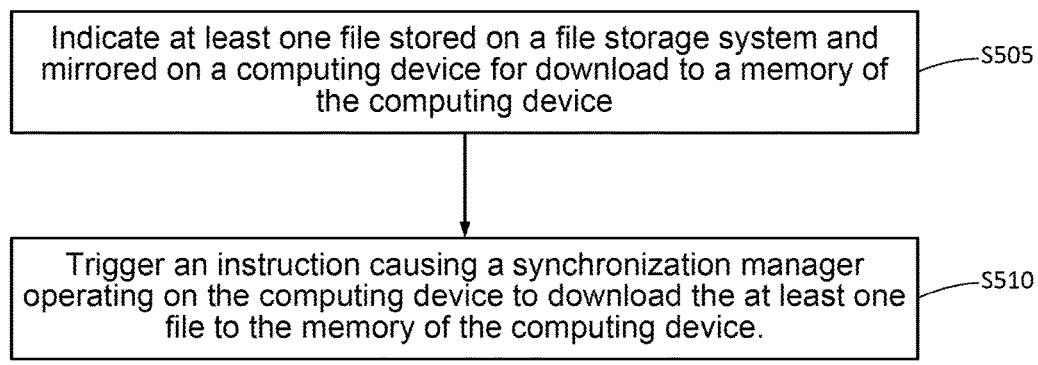

FIG. 5 illustrates a flow diagram of an example process for downloading a file to a computing device, in accordance with an example implementation. As shown in FIG. 5, in step S505 at least one file stored on a file storage system and mirrored on a computing device is indicated for download to a memory of the computing device. For example, the file 20A can be a file that is downloaded to (e.g., fetched for) the computing device 125 for use at the computing device 125 by a user and stored on the computing device 125 as file 20B. The trigger may be in response to a pre-fetch as determined by pre-fetch module 245. The trigger may be in response to a file access (e.g., read) as handled by the filter module 260 upon determining, by the filter module 260, that the file is not stored on the computing device 105, 125, 205.

In step S510 an instruction causing a synchronization manager operating on the computing device to trigger a download of the at least one file to the memory of the computing device. For example, the filter module 260 may determine the file has been opened (e.g., selected to be opened by a user of application 140, 280) that is not currently stored on the computing device 105, 125, 205. The filter module 260 may then cause the sync manager 255 to download the file to be opened. The filter module 260 may cause a delay in the application 140, 280 as the application 140, 280 attempts to read the file (e.g., because the application 140, 280 has an indication that the file exists on the computing device 105, 125, 205 when the file does not exist on the computing device 105, 125, 205).

In an example implementation, the filter module 260 may communicate a command to the synchronization manager 255. The command may indicate the file (e.g., file 20A) on the storage system 150 has changed. The indication that the file has changed may trigger the synchronization manager 255 to download the file and replace (noting that the file is not currently stored on the computing device 105, 125, 205) the file on the computing device 105, 125, 205 with the downloaded file (e.g., as file 20B). In order to determine the file is not currently stored on the computing device 105, 125, 205, the filter module 260 may maintain a list of files. The list of files may include a listing of files not stored on the computing device 105, 125, 205 or a list of files that are stored on the computing device 105, 125, 205. The filter module 260 may determine the file is not currently stored on the computing device 105, 125, 205 based on the list (e.g., by performing a search of the list).

Figure 6:
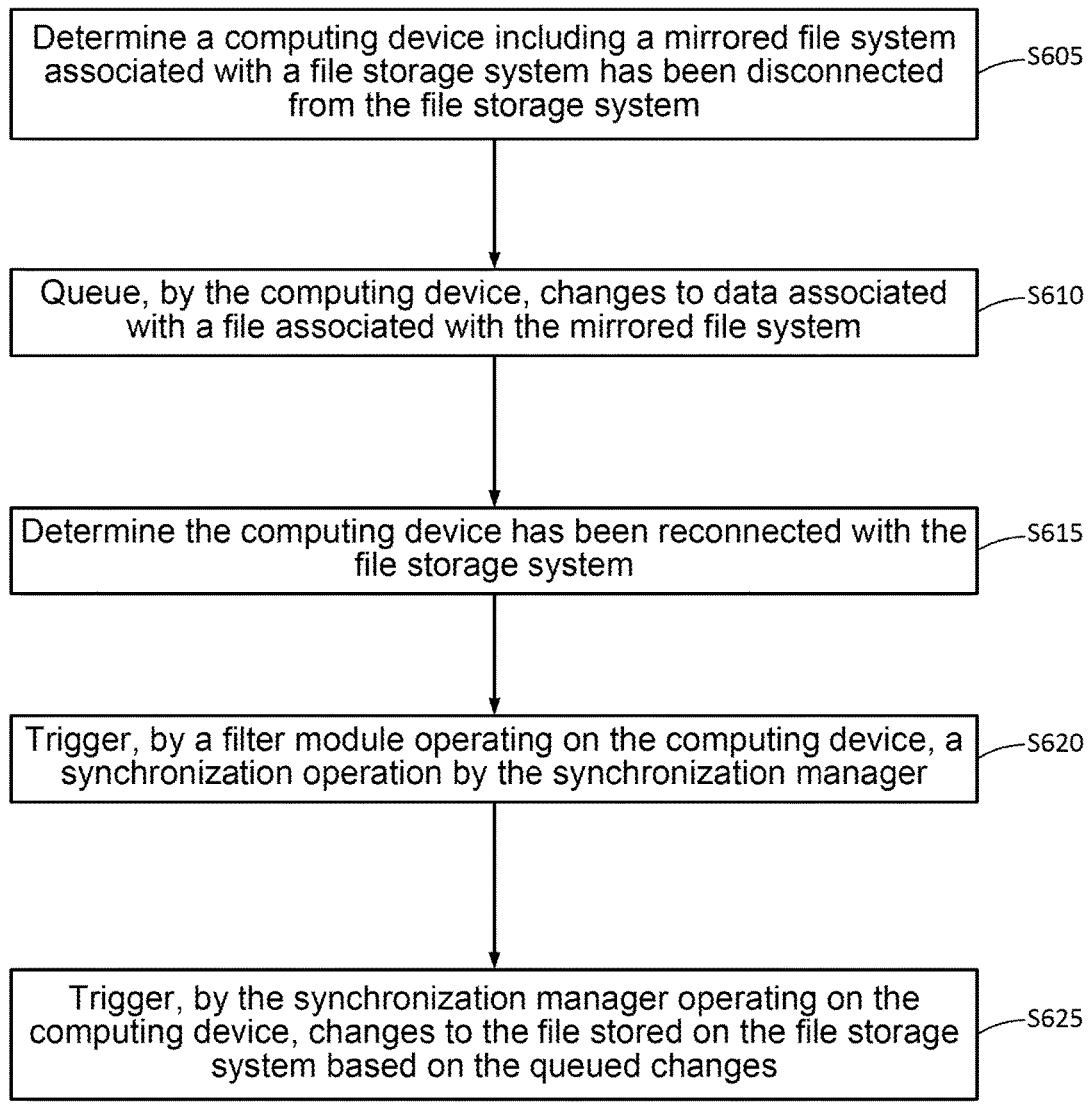

FIG. 6 illustrates a flow diagram of an example process for synchronizing a file, in accordance with an example implementation. As shown in FIG. 6, in step S605 a computing device including a mirrored file system associated with a file storage system determines that it has been disconnected from the file storage system. For example, the computing device may determine a wireless (e.g., WiFi) connection has been lost. In this example, a user of the device may want to continue viewing, editing, and/or creating files that should be synchronized with the file storage system. Therefore, any file that is also stored on (or created in) the file system mirrored on the computing device 105, 125, 205 can continue to be utilized even though there is no connection to the storage system 150, 210.

In step S610 the computing device queues changes to data associated with a file associated with the mirrored file system. For example, any changes made to file 20B by an application 140 executing on computing device 125 can be queued (e.g., in a corresponding change queue 265) while the computing device 125 is disconnected (e.g., out of range) from the wireless (e.g., WiFi) network.

In step S615 the computing device determines it has been reconnected with the file storage system. For example, the computing device 125 can come within range of an authorized wireless (e.g., WiFi) network. After completion of a connection protocol, the computing device 125 may be automatically (e.g., without user interaction) reconnected with the storage system 150.

In step S620 a filter module operating on the computing device triggers a synchronization operation by the synchronization manager. For example, the filter module 260 may communicate a command to the synchronization manager 255. The command may indicate each file in the queue (e.g., change queue 265) has changed. The indication that each file has changed may trigger (in step S625) the synchronization manager 255 to perform a synchronization operation with the corresponding file(s) on the storage system 150, 210 which causes the storage system 150, 210 to update the files stored on the storage system 150, 210 with the queued changes.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code, the computer executable program code or code segments to perform the necessary tasks may be stored in or on a machine or computer readable medium such as a storage medium and/or a non-transitory computer-readable storage medium. A processor(s) (e.g., a silicon or GaAs based processor) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. An apparatus comprising:
   a memory including a mirrored file system associated with a file storage system, the mirrored file system including metadata describing the file storage system, the file storage system being configured as a primary storage system for the apparatus, and the memory being configured as a cache of the file storage system;
   a filter module associated with the mirrored file system and configured to:
      during a mirroring process, communicate a message configured to indicate file data representing a file associated with the mirrored file system is stored in the memory when the file data is not currently stored in the memory, and
      trigger a file operation based on an intercepted access request for the file; and
   a synchronization manager configured to:
      during the mirroring process and in response to receiving the message, prevent an initial downloading of the file data, and
      trigger a synchronization operation to the file storage system based on the file operation triggered by the filter module, the synchronization operation including downloading the file data from the file storage system to the memory.

2. The apparatus of claim 1, wherein the filter module is further configured to:
   intercept an access to the file associated with the mirrored file system, the access being based on the file operation;
   pass the file operation to a utility configured to request services of a file system associated with the apparatus; and
   notify the synchronization manager if the access to the file changes data associated with the file.

3. The apparatus of claim 1, wherein the synchronization manager is further configured to:
receive a notification that the file associated with the mirrored file system has changed;
determine a change associated with the file associated with the mirrored file system; and
trigger an update of the file on the file storage system based on the determined change.

4. The apparatus of claim 1, wherein
the file data is absent from the memory, and
the triggered synchronization operation causes:
an application associated the access to the file to pause operation,
the file data to be downloaded to the memory, and
a list of files stored in the memory to be updated to include the file.

5. The apparatus of claim 1, wherein the mirrored file system is generated based on metadata associated with the file storage system.

6. The apparatus of claim 1, wherein
the filter module is further configured to prevent the synchronization manager from scanning the mirrored file system for changes to any of a plurality of files associated with the mirrored file system,
the file operation causes a change to data associated with one of the plurality of files associated with the mirrored file system, and
the triggered synchronization operation to the file on the file storage system causes changes to the file based on the change to the data associated with the one of the plurality of files.

7. The apparatus of claim 1, further comprising a pre-fetch module configured to:
indicate at least one file stored on the file storage system for download, and
trigger an instruction causing the synchronization manager to download the at least one file to the memory.

8. A method comprising:
generating a mirrored file system in a local computing device based on a file system stored on a file storage system, the mirrored file system including metadata describing the file storage system, the file storage system being configured as a primary storage system for the local computing device, and the local computing device including a memory configured as a cache of the file storage system;
while generating the mirrored file system, preventing, by the local computing device, a downloading of file data representing a file of the mirrored file system from the file storage system, the preventing of the downloading of the data including indicating to the local computing device that the data is stored in the memory when the data is not currently stored in the memory; and
in response to a file operation, triggering a synchronization operation to the file storage system, the synchronization operation including downloading the file data from the file storage system to the memory.

9. The method of claim 8, further comprising:
intercepting the file operation to the file of the mirrored file system;
passing the file operation to a utility configured to request services of a file system associated with the local computing device; and
triggering the synchronization operation if the file operation changes data associated with the file.

10. The method of claim 8, further comprising:
receiving a notification that data associated with the file of the mirrored file system has changed; and
triggering an update to data associated with a file on the file storage system based on a changed data.

11. The method of claim 8, wherein generating of the mirrored file system includes generating the mirrored file system based on metadata associated with the file storage system.

12. The method of claim 8, further comprising:
preventing a scanning of the mirrored file system for changes to any of a plurality of files associated with the mirrored file system;
intercepting the file operation that causes a change to data associated with one of the plurality of files associated with the mirrored file system; and
triggering the synchronization operation to data corresponding to the one of the plurality of files on the file storage system based on the change to the data associated with the one of the plurality of files.

13. The method of claim 8, further comprising:
indicating at least one file stored on the file storage system for download, and
triggering an instruction causing the at least one file to be downloaded to a memory of the local computing device.

14. A non-transitory computer-readable storage medium having stored thereon computer executable program code which, when executed on a computer system, causes the computer system to perform steps comprising:
generating a mirrored file system in a local computing device based on a file system stored on a file storage system, the mirrored file system including metadata describing the file storage system, the file storage system being configured as a primary storage system for the local computing device, and the local computing device including a memory configured as a cache of the file storage system;
while generating the mirrored file system, preventing, by the local computing device, a downloading of file data representing a file of the mirrored file system from the file storage system, the preventing of the downloading of the data including indicating to the local computing device that the file data is stored in the memory when the file data is not currently stored in the memory;
intercepting an access to the file; and
in response to the access the file, triggering a download of the file data from the file storage system to the local computing device.

15. The non-transitory computer-readable storage medium of claim 14, wherein the computer executable program code further causes the computer system to:
intercepting a file operation to the file of the mirrored file system;
passing the file operation to a utility configured to request services of a file system associated with the local computing device; and
triggering a synchronization operation if the file operation changes data associated with the file.

16. The non-transitory computer-readable storage medium of claim 14, wherein the computer executable program code further causes the computer system to:
receive a notification that data associated with the file of the mirrored file system has changed; and
trigger an update to data associated with a file on the file storage system based on a changed data.

17. The non-transitory computer-readable storage medium of claim 14, wherein generating of the mirrored file system includes generating the mirrored file system based on metadata associated with the file storage system.

18. The non-transitory computer-readable storage medium of claim 14, wherein the computer executable program code further causes the computer system to:
   prevent a scanning of the mirrored file system for changes to any of a plurality of files associated with the mirrored file system;
   intercept a file operation that causes a change to data associated with one of the plurality of files associated with the mirrored file system; and
   trigger a synchronization operation to data corresponding to the one of the plurality of files on the file storage system based on the change to the data associated with the one of the plurality of files.

* * * * *